(12) United States Patent
Choudhury et al.

(10) Patent No.: US 7,231,008 B2
(45) Date of Patent: Jun. 12, 2007

(54) FAST LOCKING CLOCK AND DATA RECOVERY UNIT

(75) Inventors: Ashish K. Choudhury, Camarillo, CA (US); Timothy V. Coe, Oxnard, CA (US)

(73) Assignee: Vitesse Semiconductor Corporation, Camarillo, CA (US)

( * ) Notice: Subject to any disclaimer, the term of this patent is extended or adjusted under 35 U.S.C. 154(b) by 762 days.

(21) Appl. No.: 10/295,276

(22) Filed: Nov. 15, 2002

(65) Prior Publication Data

US 2004/0096016 A1    May 20, 2004

(51) Int. Cl.
*H04L 7/00* (2006.01)
(52) U.S. Cl. .................. 375/354; 327/145; 327/291
(58) Field of Classification Search ........... 375/354, 375/376, 355, 269, 300, 332, 144–145, 291; 370/542, 545, 507
See application file for complete search history.

(56) References Cited

U.S. PATENT DOCUMENTS

| | | | | |
|---|---|---|---|---|
| 4,339,823 | A * | 7/1982 | Predina et al. ............... | 375/294 |
| 4,456,994 | A * | 6/1984 | Segarra ........................ | 714/33 |
| 4,672,639 | A   | 6/1987 | Tanabe et al. | |
| 4,821,297 | A * | 4/1989 | Bergmann et al. .......... | 375/376 |
| 4,868,514 | A   | 9/1989 | Azevedo et al. | |
| 4,879,720 | A * | 11/1989 | Shumate et al. ............ | 714/789 |
| 4,918,406 | A   | 4/1990 | Baumbach et al. | |
| 4,941,151 | A * | 7/1990 | Abbiate et al. ............. | 375/293 |
| 4,972,444 | A * | 11/1990 | Melrose et al. ............. | 375/376 |

(Continued)

FOREIGN PATENT DOCUMENTS

EP    0 973 289 A2    1/2000

OTHER PUBLICATIONS

Yamaoka, et al., "A CMOS Data And Clock Recovery Macrocell For Burst-Mode/Coninuous-Mode Transmissions", Custom Integrated Circuits Conference 1997, Proceedings of the IEEE 1997, Santa Clara, CA, USA May 5-8, 1997, New York (p. 45-48).

(Continued)

*Primary Examiner*—Jean B. Corrielus
(74) *Attorney, Agent, or Firm*—Christie, Parker & Hale, LLP

(57) ABSTRACT

A method of synchronizing a transmitter and a receiver, comprising: receiving a transmitted serial data stream. Creating an N-bit data sample from the serial data stream. Decoding the N-bit data sample by a ring decoding technique. The ring decoding technique comprises: creating a first code ring using the N-bit data sample, the first code ring having N ring-bit phase positions corresponding to N axis positions, with the N data bits of the N-bit data sample corresponding to one of the N ring-bit phase positions. Creating a pth Code Ring from a previous code ring using a preselected ring coding technique, the pth code ring having N ring-bit phase positions corresponding to N axis positions, with N data bits of the pth code ring corresponding to the N ring-bit phase positions of the pth code ring. Analyzing selected ones of the N data bits of the pth code ring for the presence of a sentinel condition. Identifying a one of the N ring-bit phase positions of the pth code ring as being associated with the sentinel condition. Selecting a clock signal based on the one of the N ring-bit phase positions.

12 Claims, 12 Drawing Sheets

U.S. PATENT DOCUMENTS

| | | | |
|---|---|---|---|
| 5,043,596 A | | 8/1991 | Masuda et al. |
| 5,351,271 A | * | 9/1994 | Coquerel .................... 375/224 |
| 5,392,316 A | * | 2/1995 | Sawaguchi et al. ......... 375/290 |
| 5,491,729 A | * | 2/1996 | Co et al. .................... 375/376 |
| 5,561,691 A | * | 10/1996 | Weinraub ................... 375/355 |
| 5,621,774 A | | 4/1997 | Ishibashi et al. |
| 5,673,292 A | * | 9/1997 | Carlin ........................ 375/269 |
| 5,872,959 A | | 2/1999 | Nguyen et al. |
| 6,154,506 A | * | 11/2000 | Ishikawa et al. ............ 375/326 |
| 6,167,077 A | | 12/2000 | Ducaroir et al. |
| 6,192,069 B1 | * | 2/2001 | Kubinec .................... 375/220 |
| 6,266,799 B1 | * | 7/2001 | Lee et al. ...................... 716/6 |
| 6,611,219 B1 | * | 8/2003 | Lee et al. .................... 341/141 |
| 6,987,825 B1 | * | 1/2006 | Yoshimura et al. ......... 375/371 |
| 2002/0018444 A1 | * | 2/2002 | Cremin et al. ............... 370/235 |
| 2002/0154620 A1 | * | 10/2002 | Azenkot et al. ............ 370/347 |
| 2003/0043926 A1 | * | 3/2003 | Terashima et al. .......... 375/257 |
| 2003/0161430 A1 | * | 8/2003 | Sou ............................. 375/376 |
| 2003/0219043 A1 | * | 11/2003 | Doi et al. ................... 370/542 |

OTHER PUBLICATIONS

European Search Report dated May 24, 2004 for European Application No. 04090018.5-2415 filed on Jan. 19, 2004, mailed Jun. 18, 2004 (9 pages).

Chen, et al., "A 1.25 Gb/s, 460m W CMOS Transceiver for Serial Data Communication," IEEE International Solid-State Circuits Conference, ISSCC97, Session 15, Serial Data Communications, Paper FP 15.3, pp. 242-243, and 465, 1997.

Fiedler, et al., "A 1.0625Gbps Transceiver with 2x-Oversampling and Transmit Signal Pre-Emphasis," IEEE International Solid-State Circuits Conference, ISSCC97, Session 15, Serial Data Communications, Paper FP 15.1, pp. 238-239, and 464, 1997.

* cited by examiner

FAST LOCKING CLOCK AND DATA RECOVERY UNIT

BACKGROUND

The present invention relates generally to recovering information from a data stream, and more particularly to recovering clock and data information from a serial data stream.

In digital systems data is often transferred from a transmitter to a receiver. Data is sent from the transmitter to the receiver at a nominal rate. To maximize the data sent during a given period for a given bandwidth, a clock signal for the data is generally not sent directly in the transmission. Instead the clock signal is regenerated by the receiver using the received data. In general, a clock recovery unit (CRU) in the receiver generates a clock signal, with the CRU being based on a phase locked loop (PLL), delay locked loop (DLL), or similar device.

Using a PLL as an example, a PLL is often employed in CRUs to align a locally generated clock signal relative to a phase and frequency of received data. The PLL adjusts operation of an oscillator of the PLL to form a clock signal locked in phase and frequency to that of the received data signal. Acquisition time, or lock time, refers to the amount of time the PLL requires for convergence within a certain phase error of the received signal, i.e., the time required for the PLL to go from an initial frequency offset to proper clock alignment. Typically lock times are on the order of hundreds to thousands of bit times. The amount of lock time taken by a particular CRU depends on the device employed.

For example, a CRU in a digital communication system may require reception between about 300 to about 1500 bits in order to lock to a data stream. These 300 to 1500 "lock bits" are generally effectively lost from the data stream, thereby reducing the effective bandwidth of the transmission medium. If the number of bits for any particular transmission stream is relatively small, a significant loss in transmission efficiency may occur. For example, using a relatively short data transmission packet, such as about 3K Bytes (24,000 Bits), losing 300 to 1500 bits results in a 1.25% to 6.25% loss of transmission efficiency. Moreover, when the input serial data becomes highly distorted, for example, the data develops a duty cycle of less than about 30%, a data-eye of the received signal may become small enough to potentially disrupt the operation of the CRU.

SUMMARY OF THE INVENTION

The present invention provides clock and/or data recovery. One aspect of the invention provides a method of synchronizing a transmitter and a receiver, comprising receiving a transmitted serial data stream; creating an N-bit data sample from the serial data stream; and decoding the N-bit data to effectively select a clock signal of a plurality of clock signals at substantially the same frequency but with differing phases.

Another aspect of the invention provides A method of clock and data recovery from a transmitted serial data stream, comprising creating an N-bit data sample from the serial data stream, the N-bit data sample being recovered from the serial data stream using N clock signals at N differing phases; decoding the N-bit data sample using a preselected ring decoding technique to determine which of the N clock signals to use for recovery of data from the serial data stream, wherein the preselected ring decoding technique comprises receiving a temporal snapshot having N data bits corresponding to the N-bit data sample; creating a first code ring from the temporal snapshot, the first code ring having N ring-bit phase positions corresponding to N axis positions, each one of the N data bits corresponding to one of the N ring-bit phase positions; creating a $p^{th}$ code ring from an immediately previous code ring using a preselected ring coding technique, the $p^{th}$ code ring having N ring-bit phase positions corresponding to N axis positions generally corresponding with the N axis positions of the first code ring, and one of the N data bits of the $p^{th}$ code ring corresponding to one of the N ring-bit phase positions of the $p^{th}$ code ring; identifying a one of the N ring-bit phase positions of the $p^{th}$ code ring as $\Phi_X$, $\Phi_X$ indicating a ring-bit phase position as providing a sentinal condition; determining a phase offset of $\Phi_T=p/2$, if p is even; or $\Phi_T=(p-1)/2$, if p is odd; selecting a corresponding recovered clock phase $\Phi_R$ according to the relationship $\Phi_R=\Phi_X+\Phi_T$; and recovering data from the serial data stream using the corresponding recovered clock phase.

Another aspect of the invention provides a method of extracting data from a transmitted serial data stream, comprising creating an N-bit data sample from the serial data stream, the N-bit data sample being representative of data recovered using clock signals of N differing phases; decoding the N-bit data sample using a preselected multiple-ring decoding technique to form a selection signal indicative of a selected clock phase; using the selection signal to select data sampled at a selected one of the N differing phases to form recovered data.

Another aspect of the invention provides a clock and data recovery apparatus, comprising a multiple-ring decoder and phase selector that receives a temporal data snapshot and responsive thereto decodes the temporal data snapshot and produces a corresponding recovered clock phase signal; and a multiplexer coupled with the decoder and phase selector that receives a transmitted data stream and responsive to the corresponding recovered clock phase signal extracts recovered data from the data stream.

Another aspect of the invention provides a burst mode transmission system having multiple data sources providing data over a data link to a receiving unit, the data sources providing data over the data link over separate time periods, the separate time periods being relatively small time periods, with the data sources providing data at substantially the same data rate, with the receiver comprising a clock unit generating multiple clock signals at the same frequency and differing phases; a register unit sampling the data stream using the multiple clock signals to form a parallel sampled data stream; a decoder processing the parallel sampled data stream to determine which data stream of the parallel sampled data stream to use as recovered data, the decoder providing a selection signal indicative of the data stream to use as recovered data; and a multiplexer receiving the parallel sampled data stream and providing an output data stream based on the selection signal.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION

The present invention provides a clock recovery unit (CRU) and a clock and data recovery unit (CDR). For convenience, further reference will be to a CRU, although some aspects described also relate to a CDR. Various embodiments of the CRU lock to incoming serial data in short bit time. One embodiment of a CRU of the present invention locks to incoming serial data in less than 8 bit times.

Figure 1:
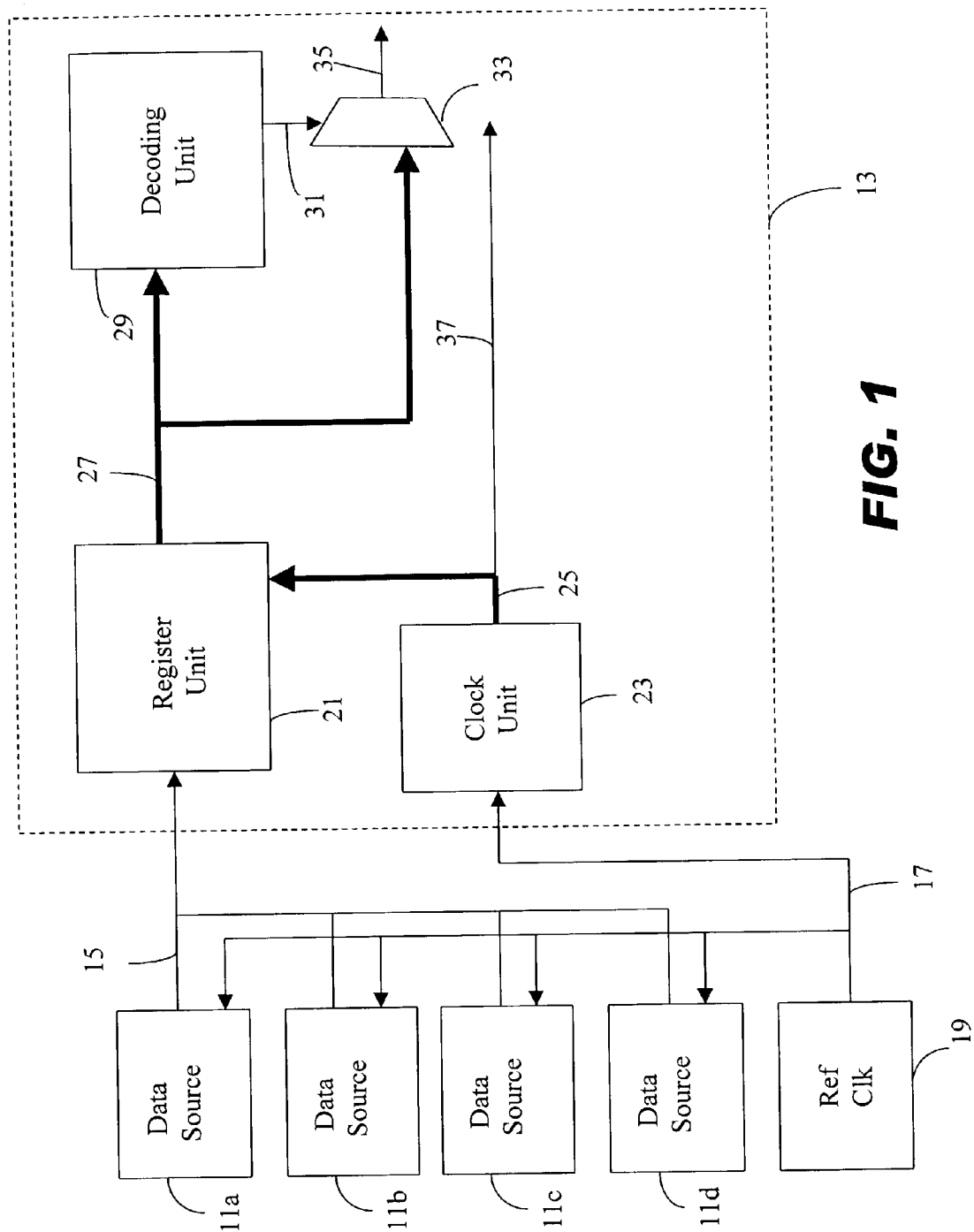
FIG. 1 is a block diagram of a system in accordance with aspects of the invention.

FIG. 1 illustrates a block diagram of a system in accordance with aspects of the invention. In FIG. 1 a plurality of data sources 11a–d provide data to a processing unit 13. The data sources may be, for example, disk drives or other processing units. The data is provided to the processing unit over a common serial data link 15, with one of the data sources potentially providing data to the processing unit at a given time. Each of the data sources and the processing unit are provided a common reference clock signal 17 from a reference clock 19.

In operation the processing unit receives data from the various data sources in a burst mode fashion. In other words, each of the data sources may, for a relatively short period, provide data to the processing unit.

Because of variations in the length of the transmission path between the data sources and the processing unit, process variations between the data sources, and variations in the transmission length of the clock signal line, information provided from any data source to the processing unit is likely to be slightly out of phase compared with data from the other data sources. Depending on the data transmission rate and other factors, these differences in phase may result in sufficient shifts in the data eye provided to the processing unit such that the processing unit cannot sample data from all the data sources at the same location in the data eye. In burst mode systems, however, determining the appropriate phase for sampling a particular data stream may be time consuming. Particularly in systems in which relatively small amounts of data provided from any data source at any given time, the timing of the appropriate phase for sampling may severely restrict the effective bandwidth of the system.

The processing unit of the system of FIG. 1 is arranged to sample data from different sources at different phases if appropriate. Incoming data signal is provided to a register unit 21. The reference clock signal is provided to a clock unit 23. The clock unit in various embodiments may include a PLL or DLL. The clock unit generates multiple clock signals 25 using the reference clock signal. The plurality of clock signals are at the same frequency, but have differing phases. This is done with a ring oscillator in one embodiment, but in various other embodiments tapped delay lines or other architectures are used.

In many embodiments the plurality of clock signals are at a frequency that is a multiple of the reference clock signal. In some embodiments, however, the plurality of clock signals are at the same frequency as the reference clock signal. The use of a lower frequency reference clock signal, however, is preferred because of, for example, difficulties associated with routing of high speed clock signals on circuit boards.

The multiple clock signals are provided to the register unit. The register unit also receives the incoming serial data stream. The register unit clocks out the serial data stream using the multiple clock signals, forming a parallel data stream 27. The parallel data stream is formed of samples of the data stream over a small period. The parallel data stream is provided to a decoding unit 29. The decoding unit determines which sample represents the center of a data eye. The decoding unit provides a selection signal 31 based on the sample determined to be at the center of the data eye. The selector signals 25 is provided to a multiplexer 33. The multiplexer also receives the parallel data stream. The selection signal causes the multiplexer to select from the parallel data stream the sample expected to be at the center of the data eye. Accordingly, the multiplexer provides a recovered output data stream 35.

The processing unit of FIG. 1 also includes in various embodiments reclocking registers (not shown). The reclocking registers reclock the recovered output data stream to a common clock phase. This allows subsequent units within the processing unit to utilize a single common clock signal 37, helping to avoid clock glitches and other inconsistencies.

Figure 2:
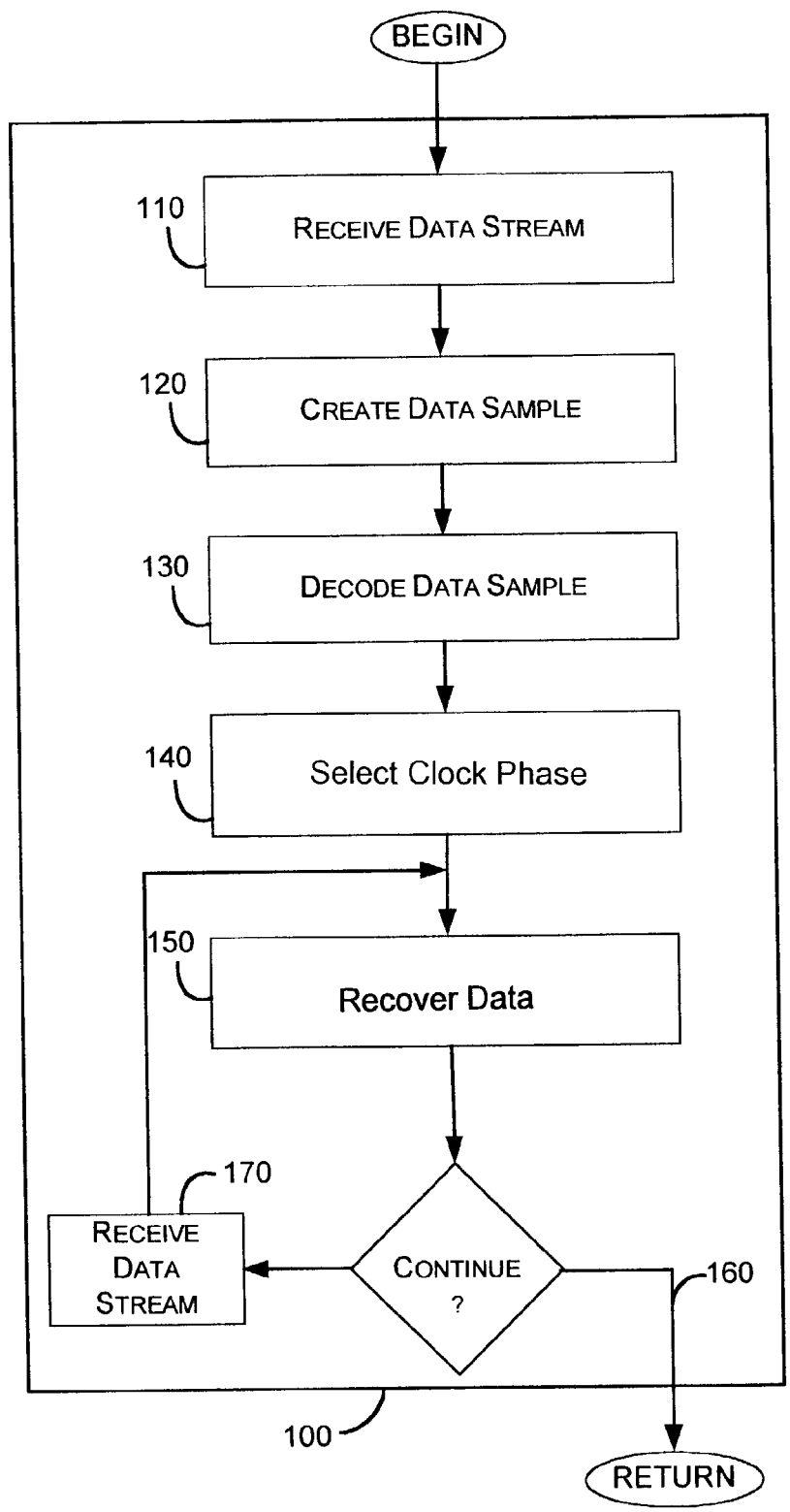
FIG. 2 is a flow diagram of a method in accordance with aspects of the invention.

FIG. 2 illustrates a method 100 in accordance with aspects of the invention. In operation 110, a serial data stream is received. The data stream is received in various embodiments, for example, over a fiber optic communication channel, over a data path connecting two integrated circuits, or over other data paths. An N-bit data sample is created from the serial data stream in operation 120. In one embodiment of the invention, operation 120 is performed using a window signal. The window signal, in some embodiments, is a signal with a width of M-bits formed from the serial data stream. In one embodiment, the window signal is a 2-bit window signal formed from the serial data stream. The N-bit data sample is formed of the data stream over the 2-bit window.

The N-bit data sample is decoded in operation 130. In one embodiment, the sample is a N-bit sample over a temporal window, and the sample is decoded using ring decoding techniques. In operation 140 a clock signal is selected based on the decoding of the data sample. In one embodiment the clock signal is selected by selecting a clock phase from a number of clock phases. In some aspects of the invention, it is desirable to extract and place the active edge of the clock signal substantially at the center of the serial data-eye. In some embodiments, however, the active edge of the clock signal is positioned at a location in the data eye expected to provide most efficient data recovery.

The clock signal is used to extract recovered data from the incoming data stream in operation 150. If the process is discontinued, operation 160, for example when a "RESET" or "END OF TRANSMISSION" (EOT) signal is received, the process returns. Otherwise the process receives further data in operation 170 and returns to operation 150 to recover further data.

In one embodiment, the time from creation of the N-bit data sample to the time the corresponding recovered clock phase is selected, i.e., the lock time, is approximately eight (8) bit times. Alternatively, the lock time is the time from when serial data is received to the time the clock is locked.

Figure 3:
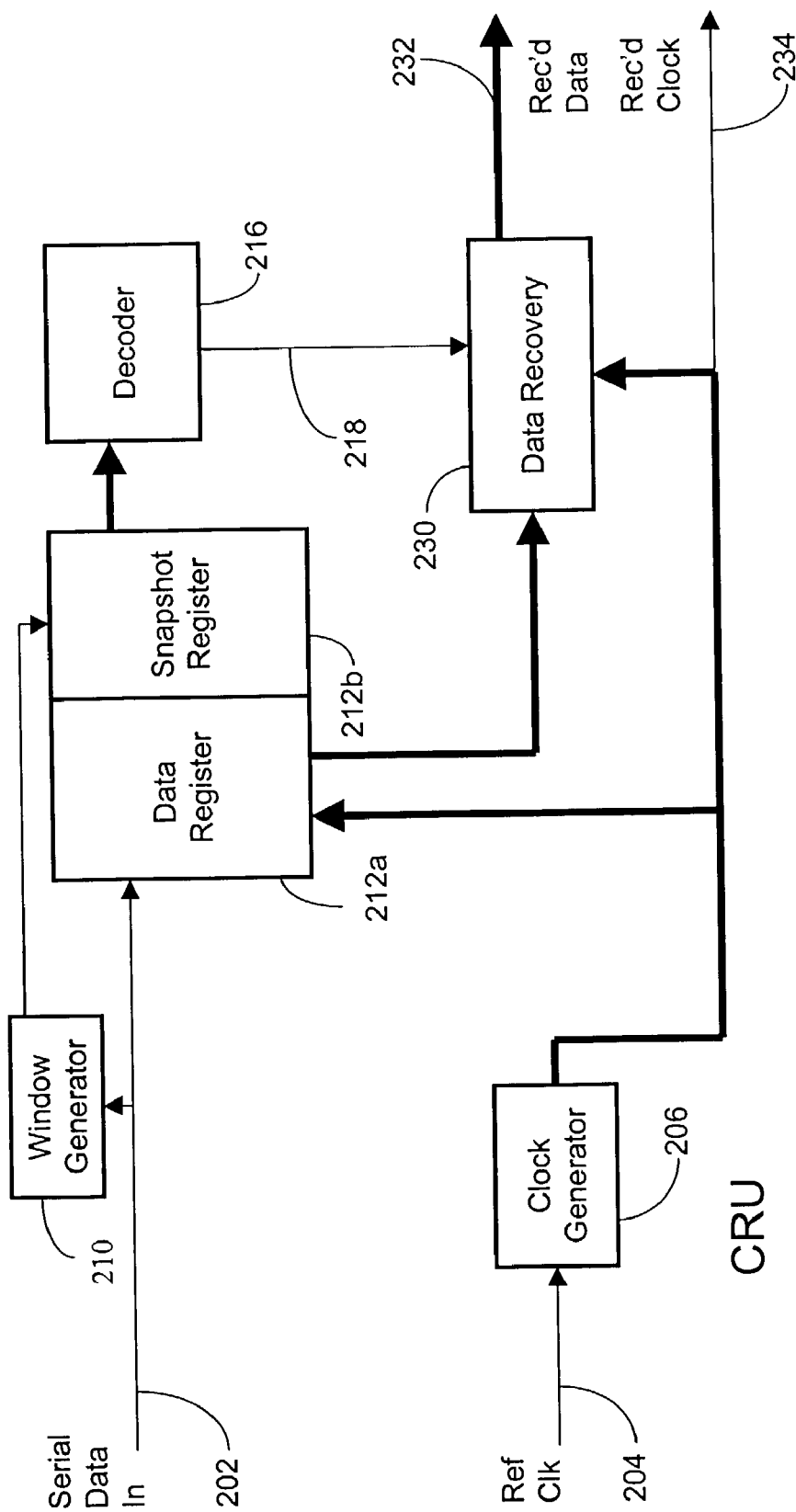
FIG. 3 is a block diagram of a clock and data recovery unit in accordance with aspects of the invention.

FIG. 3 illustrates an embodiment of a CRU in accordance with aspects of the invention. The CRU receives serial data 202 and an external reference clock signal 204. The reference clock signal is provided to a clock generator 206. The clock generator generates multiple clock signals with the same frequency but with differing phases. The multiple clock signals are provided to a data/snapshot register 212.

The serial data is provided to a window generator 210 and the data register. The window generator forms a window signal using the serial data. In one embodiment the window generator forms the window signal by locating data transitions in the serial data, and setting the window signal to a predefined value for a set number of data transitions. In one embodiment the window signal is set high, for example, to capture the incoming data over two data bit times. Thus, in some embodiments an initial pattern, of for example 0101, is sent from a transmitter to a receiver incorporating the CRU to allow for ease in forming the window signal, and for other purposes. The window signal is provided to snapshot register 212*b*.

The data/snapshot register forms data snapshots of the data stream. The data snapshots are formed using the multiple clock signals. In some embodiments of the invention, the data snapshots are an N-bit sample of the serial data, taken over an M-bit window indicated by the window signal.

The data snapshots are provided to a decoder 216. The decoder decodes the data snapshots to determine which of the multiple clock signals, and therefore the phase of a recovered clock, to use for recovering data. In one embodiment the decoder determines which of the multiple clock signals to use by locating data transitions among the N-bit data samples. The data transitions in the N-bit data samples imply data transitions in the M-bit data window, as well as a center of a data eye in the M-bit data window. In one embodiment this is accomplished using ring decoding.

The decoder provides a selection signal, which may comprise multiple signals, to a data recovery block 230. The selection signal provides an indication of a clock phase to use in extracting data. The data recovery block selects data samples, formed using the data register as illustrated, to form recovered data 232.

Figure 4:
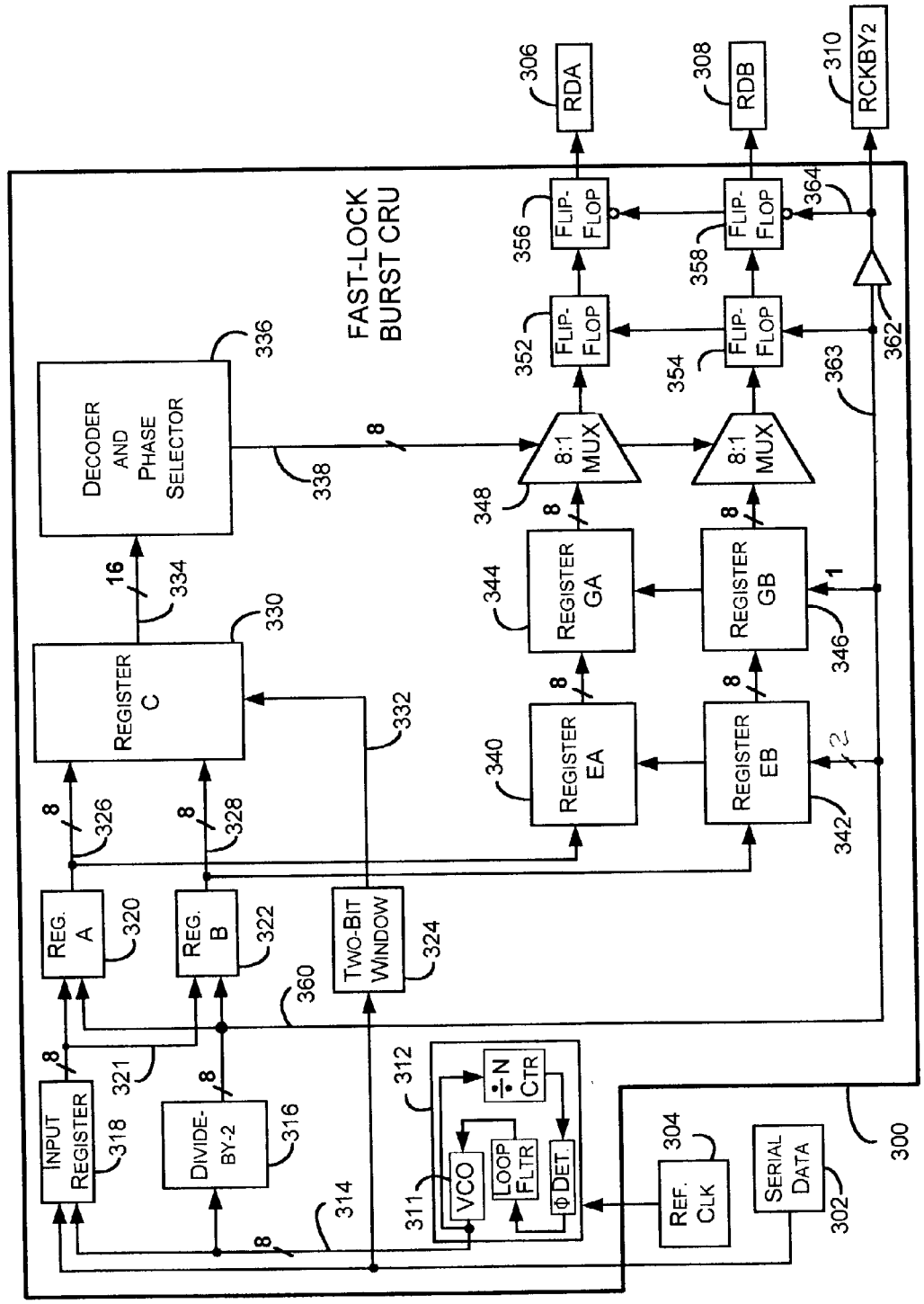
FIG. 4 is a further block diagram of a clock and data recovery unit in accordance with aspects of the invention.

FIG. 4 illustrates a further embodiment of a CRU 300. In the CRU of FIG. 4 a reference clock 304 provides a reference clock signal to a PLL 312. The PLL includes a VCO 311 providing eight clock signals 314, with the eight clock signals equally spaced in phase and at a common frequency.

The eight clock signals are used by an input register to store incoming data from the serial data stream. As the eight clock signals all have a frequency about the data rate of the incoming data, the input register store eight samples of the incoming data over a one bit period of the incoming data. Accordingly, the input register may be viewed as taking eight slices of a bit in the incoming data stream. It should be recognized, though, that the eight slices likely may extend across bit boundaries of the incoming data.

In the embodiment of FIG. 4, the effective data rate of the incoming data is slowed by a factor of two, as a convenience for further processing. Accordingly, the eight clock signals are provided to a divide-by-2 block 316. The divide-by-2 block forms eight further clock signals 360, with the eight further clock signals corresponding to the eight clock signals, but at half the frequency. The eight further clock signals are provided to a register A 320 and a register B 322. Both register A and register B are eight bit registers, and receive eight samples from the input register. Register A, however, stores data on falling edges of clock signals while register B stores data on rising edges of clock signals. Accordingly, with the input register clocking data at a rate twice as fast as registers A and B, register A stores eight slices from the input register from a first bit period and register B stores eight slices from the input register from a succeeding bit period. Together, therefore, registers A and B store sixteen slices covering a two bit window in the incoming data stream.

The 16 slices, or bits, from registers A and B are provided to a register C 330. Register C, in the embodiment illustrated in FIG. 4, uses a signal generated by a two-bit window block to latch data. In one embodiment, the two bit window block is adapted to receive a 0101 sequence at the beginning of transmissions. The 0101 sequence provides two 0 to 1 transitions. The first 0 to 1 transition results in the window opening, and the second 0 to 1 transition results in the window closing. Thus, in one embodiment, the two-bit window block forms a window signal which changes state on the 0 to 1 transitions, with the window signal, for example, being high for two bit times. Register C stores data while the window is open.

The 16 bits in register C are provided to a Decoder and Phase Selector 336. The Decoder and Phase Selector selects a phase for extracting data based on the 16 bits. The selection signal is provided to two 8×1 multiplexers 348, 350. The two 8×1 multiplexers each receive eight data bits sourced by registers A and B, respectively. Prior to being provided to the multiplexers, however, the bits are each provided to two sequential eight bit registers 340, 342 and 344, 346, respectively. The two sequential eight bit registers reclock the bits such that the multiplexers receive the bits in parallel.

The multiplexers select one each of the eight bits based on the selection signal. Each multiplexer therefore provides one bit of an eight bit sample over a one bit period for use by further modules and components, with the output of each multiplexer forming half of an interleaved data stream at half the data rate.

Figure 6:
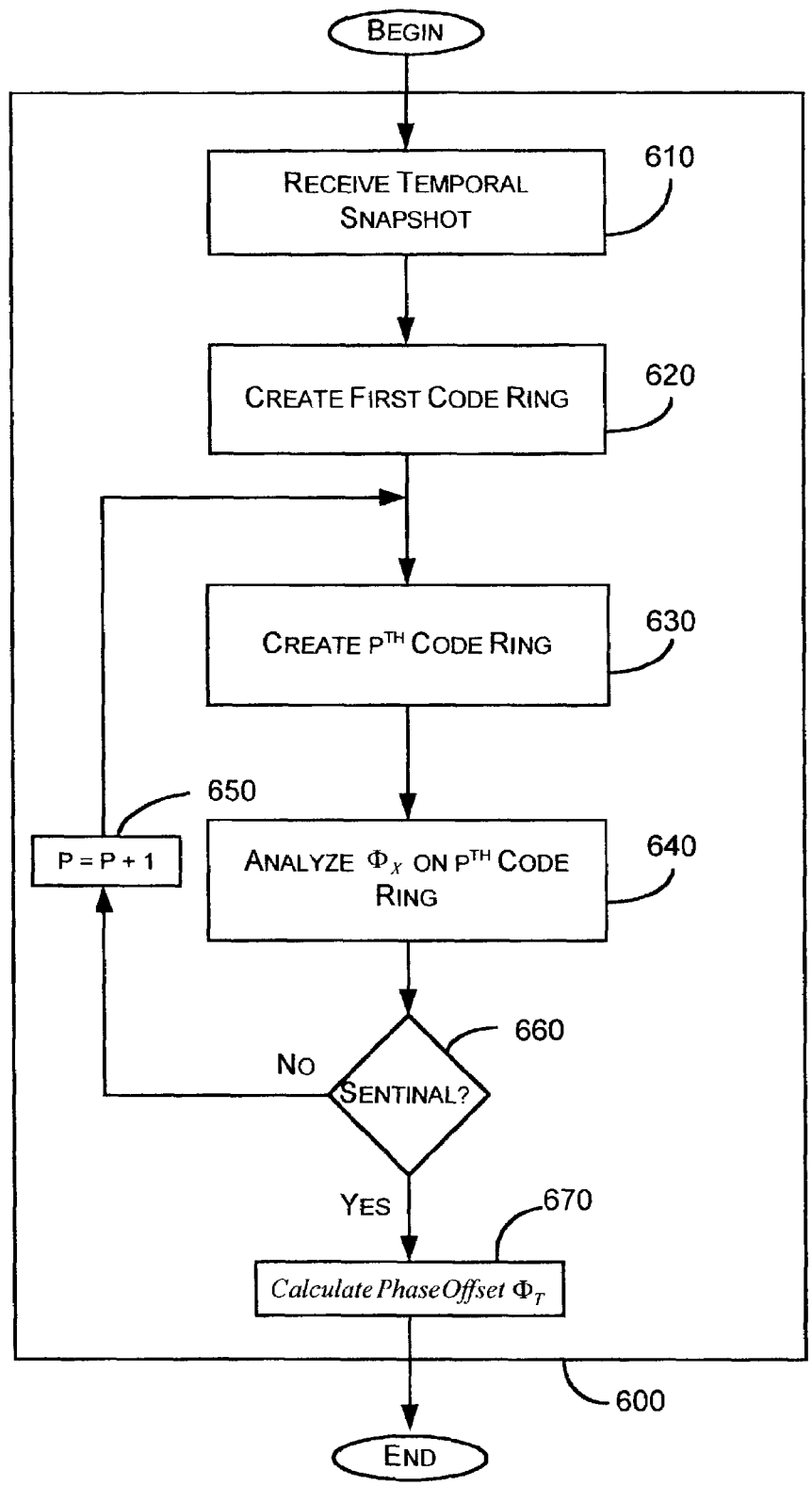
FIG. 6 is a block flow diagram of an aspect of a ring coding technique in accordance with teachings of the present invention.

FIG. 6 is a flow diagram of a method 600 used in some embodiments by the Decoder and Phase Selector of FIG. 4. In general, the method includes receiving a temporal snapshot, operation 610; creating a first Code Ring from the temporal snapshot, operation 620, with each temporal snapshot data bit D0–D15 being mapped to one of ring-bit phase positions $\Phi_0 \ldots \Phi_{15}$; creating a $p^{th}$ Code Ring from the $(p-1)^{th}$ Code Ring using a preselected ring coding technique, operation 630; analyzing the $p^{th}$ Code Ring for the presence of a sentinel condition, operation 640, at phase position $\Phi_X$, where $1 \leq \Phi_X \leq N$; if the sentinel condition is not found, then incrementing p, operation 650, and returning to create the next Code Ring, operation 630; if the sentinel condition is found (Operation 660), then determining a corresponding clock phase offset $\Phi_T$, operation 670, according to the exemplary relationships:

$\Phi_T = p/2$, where p is even-valued; and $\Phi_T = (p-1)/2$, where p is odd-valued;

and selecting the corresponding recovered clock phase $\Phi_R$ by advancing phase position of the sentinel condition $\Phi_X$ by the phase offset $\Phi_T$, such that the corresponding recovered clock phase is described by ($\Phi_R = \Phi_X + \Phi_T$). Using the corresponding recovered clock phase $\Phi_R$, a recovered clock and recovered data may be extracted from the serial input data. By selecting an appropriate sentinel condition, the active edge of the recovered clock can be placed substantially at the center of the serial data eye when recovering the data, if so desired.

As an example of the above method a decoder receives contents of a 16-bit temporal snapshot register. Data bits of the temporal snapshot D0–D15 are arranged on a logical structure to form a Ring 1. The data bit D0 corresponding to phase position $\Phi_{C0}$ is positioned at a first position, the data bit D1 is positioned at a second position adjacent the first position, and so on, until data bit D15 is positioned at a sixteenth position adjacent to data bits D14 and D0. Ring 2 includes 16 data bits which are generated by a preselected ring coding technique, such as an XNOR operation of two consecutive bits of Ring 1.

The preselected ring coding technique used to form Ring 2 502 from constituent bits 0–15 of Ring 1 501 proceeds as follows:

R2B0=R1B0 (XNOR) R1B1

R2B1=R1B1 (XNOR) R1B2

R2B2=R1B2 (XNOR) R1B3

R2B15=R1B15 (XNOR) R1B0 where R1B0 signifies Ring 1, Bit 0, R2B15 signifies Ring 2, Bit 15, and so on.

In the present example, where $2 < p \leq N$, the data bits forming the $p^{th}$ Code Ring are formed using preselected ring coding techniques which are the same, similar to, or different than, the preselected ring coding techniques used to form a preceding Code Ring. For example, the 16 bits of a Code Ring 3 are generated by a different preselected ring coding technique than used to generate Code Ring 2 502. Here, a logical AND operation of two consecutive Ring 2 bits may be implemented as follows:

R3B0=R2B0 (AND) R2B1

R3B1=R2B1 (AND) R2B2

R3B2=R2B2 (AND) R2B3

R3B15=R2B15 (AND) R2B0

In the present example, bits D0–D15 for Rings 4 505 through Ring 8 are generated using similar logical AND operations. A skilled artisan would realize that other logic operations are used in other sequences, so long as a proper phase adjustment can be obtained.

After a Code Ring is generated, it is analyzed for the presence of a sentinel condition indicative of an appropriate phase adjustment to be used in the selection of a corresponding recovered clock phase $\Phi_R$ used to extract a recovered clock signal and a recovered data signal. In one aspect of the present invention, such a sentinel condition is identified when there exists a logic '1' in a particular bit position, which has logic '0's in adjacent bit positions. For example, if, during the analysis of Code Ring p, the data bit at a ring-bit phase position $\Phi_{C9}$ is found to be a logic '1' and the data bits at phase positions $\Phi_{C8}$ and $\Phi_{C10}$ of Code Ring p are found to be logic '0', then a sentinel condition is said to exist at the data bit at ring-bit phase position $\Phi_{C9}$ on Code Ring p. If the sentinel condition is not found on Code Ring p, the value of p is incremented, as provided in operation 650, and processing continues with operation 630, in which the next ring is created. In general, the preselected ring coding techniques employed are chosen such that if a 16 bit snapshot of data, i.e., D0–D15 in Code Ring 1, has P contiguous '0's or '1's, then a sentinel condition, here a logic '1' surrounded on logic '0's, will appear on the $p^{th}$ Code Ring.

Once the sentinel conditional is found, such as on the $p^{th}$ Code Ring, it is desirable to calculate phase offset $\Phi_T$ using the exemplary relationships:

$\Phi_T = p/2$, p even; and $\Phi_T = (p-1)/2$, p odd.

Therefore, if the sentinel condition is found to exist at phase position $\Phi_X$ on Code Ring 6, then $\Phi_T = 6/2 = 3$. On the other hand, if the sentinel condition is found to exist on Code Ring 7, then $\Phi_T = (7-1)/2 = 3$. Once the sentinel condition is found, the creation and analysis of additional rings may be halted.

With phase offset $\Phi_T$ thus calculated, it is desirable to select corresponding recovered clock phase $\Phi_R$ by advancing phase position $\Phi_X$ by $\Phi_T$ such that $\Phi_R = \Phi_X + \Phi_T$. Thus, if $\Phi_X = 7$ and $\Phi_T = 3$, then $\Phi_R = 10$. Turning to the graticule of logical structure 500, phase position 10 is seen to correspond with $\Phi 2_B$, thus phase 2 of clock signal 360 is selected by decoder 336 as the recovered clock phase by which to extract recovered data RDA 306, RDB 308.

An aspect of the aforementioned multiple-ring coding technique is described with concurrent reference to FIGS. 5A–5G, and FIG. 6. FIGS. 5A–5G graphically illustrate decoding using exemplary multiple-ring coding with selected snapshots of data. FIG. 6 provides a flow diagram for an aspect of ring decoding technique 600 corresponding to FIGS. 5A–5G. The decoding technique 600 can be employed, for example, in decoder and phase selector 336 in FIG. 4, as well as within the context of operation 130 in FIG. 2.

In general, an aspect of the invention can employ a logical structure arranged to accommodate P multiple, substantially concentric code rings, with each ring being radially transected by N multiple axes. These axes are generally spaced evenly apart around the code rings. At each ring-axis (phase) intersection is a ring-bit phase location, at which can be disposed a corresponding logic bit. In FIGS. 5A–5G, these axes delineate 16, or 2M, ring-bit phase positions on each code ring.

Figure 5A:
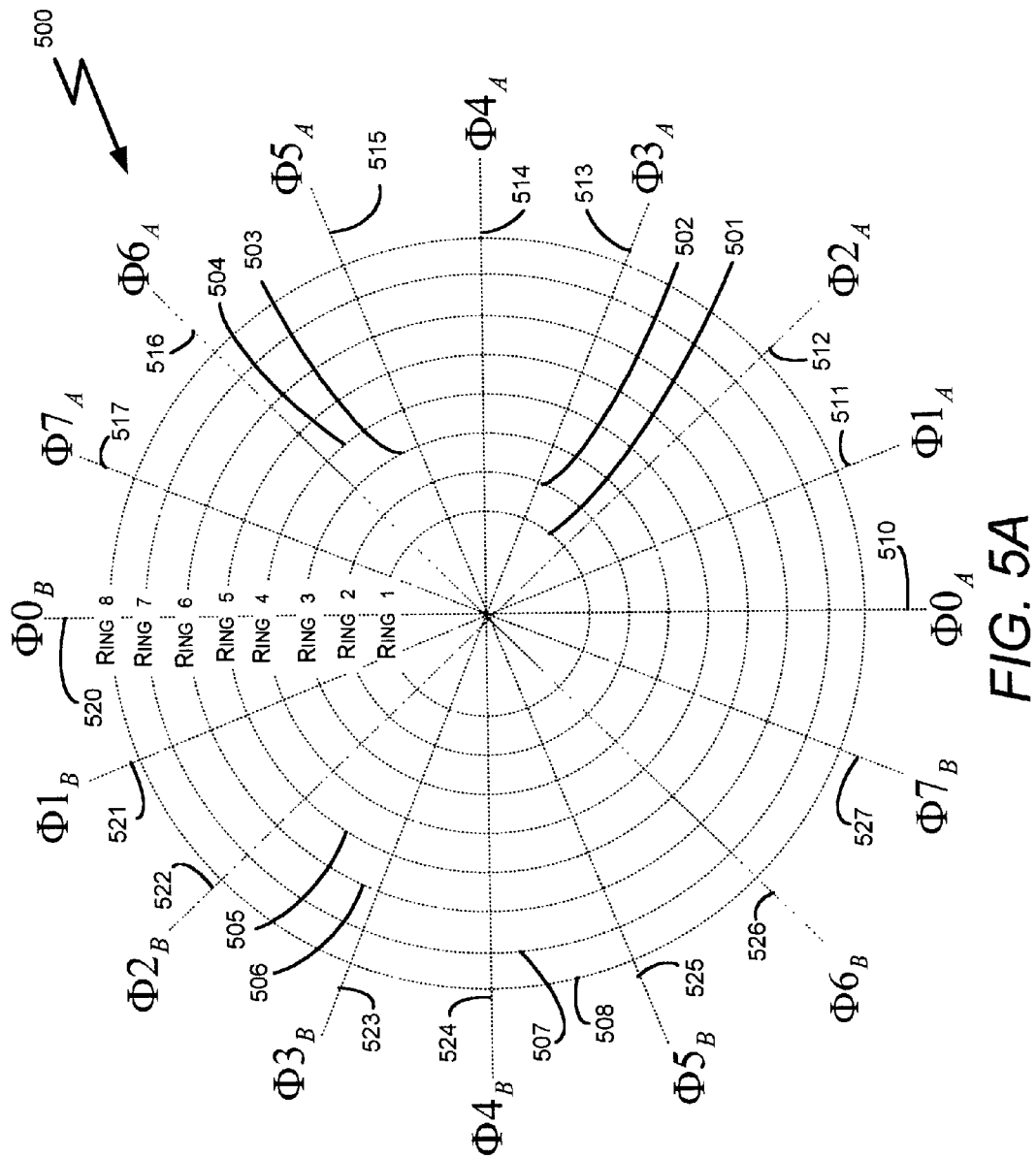
FIG. 5A is a graphical representation of a logical structure employed in an aspect of the invention.

The examples depicted by FIGS. 5A–5G illustrate an aspect of the operation of a CRU 300 in FIG. 4 when implicating an exemplary method such as the ring decoding technique of FIG. 6. Logical structure 500 of FIG. 5A is arranged as a graticule accommodating eight, substantially concentric code rings 501–508. Each code ring 501–508 is radially transected by eight (8) axes $\Phi 0_{A-B} \ldots \Phi 7_{A-B}$. Axis positions $\Phi 0_A - \Phi 7_A$ 510–517 are associated with one register, such as register A in FIG. 4, and Axis positions $\Phi 0_B - \Phi 7_B$ 520-527 are associated with another register, such as register B in FIG. 4. Each axis, and axis position 510–517, 520–527 are generally spaced apart evenly around Code Rings 501–508, thereby forming sixteen (16) ring-bit phase positions $\Phi_{C0}$–$\Phi_{C15}$, on each code ring 501–508. As illustrated in FIGS. 5A–G, the ring-bit phase positions begin with the 6-o'clock position, or South Pole, on the graticule defining logical structure 500, and proceed counter-clockwise.

Innermost Code Ring 1 is designated as ring 501, Code Ring 2 is designated as ring 502, and so on, with outermost Code Ring 8 being designated as ring 508. An eight-phase clock signal, such as signal 360 in FIG. 3, transfers data from 8-bit register A 320 and 8-bit register B 322, into 16-bit temporal snapshot register C 330. Data bit locations D0–D7 of Register A 320 correspond to data bit locations D0–D7 of register C 330; and to ring-bit phase positions $\Phi_{C0}$ . . . $\Phi_{C7}$ on axis positions $\Phi 0_A$–$\Phi 7_A$ 510–517 of Code Ring 1. Likewise, data bit locations D0–D7 of Register B 322 correspond to data bit locations D8–D15 of register C 330; and to ring-bit phase positions $\Phi_{C8}$ . . . $\Phi_{C15}$ on axis positions $\Phi 0_B$–$\Phi 7_B$ 520–527 of Code Ring 1. In addition, for each Code Ring 2–8 502–508, similar ring-bit phase positions $\Phi_{C0}$ . . . $\Phi_{C7}$ and $\Phi_{C8}$ . . . $\Phi_{C15}$ are defined on axis positions $\Phi 0_A$–$\Phi 7_A$ 510–517 and on axis positions $\Phi 0_B$–$\Phi 7_B$ 520–527, respectively.

Additional insight into aspects of the present invention may be gained by reference to specific examples of process 600, as illustrated by FIGS. 5B–5G. TABLE 1 summarizes for each example of FIGS. 5B–5G, the data bits D0 . . . D15 in the corresponding temporal snapshot, along with the corresponding Code Ring Phase positions $\Phi_{C0}$ . . . $\Phi_{C15}$ for each data bit; the Code Ring on which the sentinel condition exists in the particular example; and, using method 600, the corresponding recovered clock phase, for example, of clock signal 360, in FIG. 4.

TABLE 1

| EXAMPLE FIG. | Temporal Snapshot D0 . . . D15 Ring 1 Phase Position $\Phi_0$ . . . $\Phi_{15}$ | Ring Location of Sentinel | Recovered Clock Phase |
|---|---|---|---|
| FIG. 5B | 0000000011111111 | 8th | Phase_4 |
| FIG. 5C | 0000001111111111 | 6th | Phase_3 |
| FIG. 5D | 0000011111111111 | 5th | Phase_2 |
| FIG. 5E | 0001111111111111 | 3rd | Phase_1 |
| FIG. 5F | 0000001011111101 | 6th | Phase_3 |
| FIG. 5G | 0000000101111111 | 7th | Phase_3 |

In FIGS. 5B–5G, the occurrence of a '1' designates that ring-bit location to be a logic '1'; a '0' designates that ring-bit location to be a logic '0'; and an 'X' designates that ring-bit location to be "DON'T CARE", i.e., a ring-bit location for which a value was not determined.

Figure 5B:
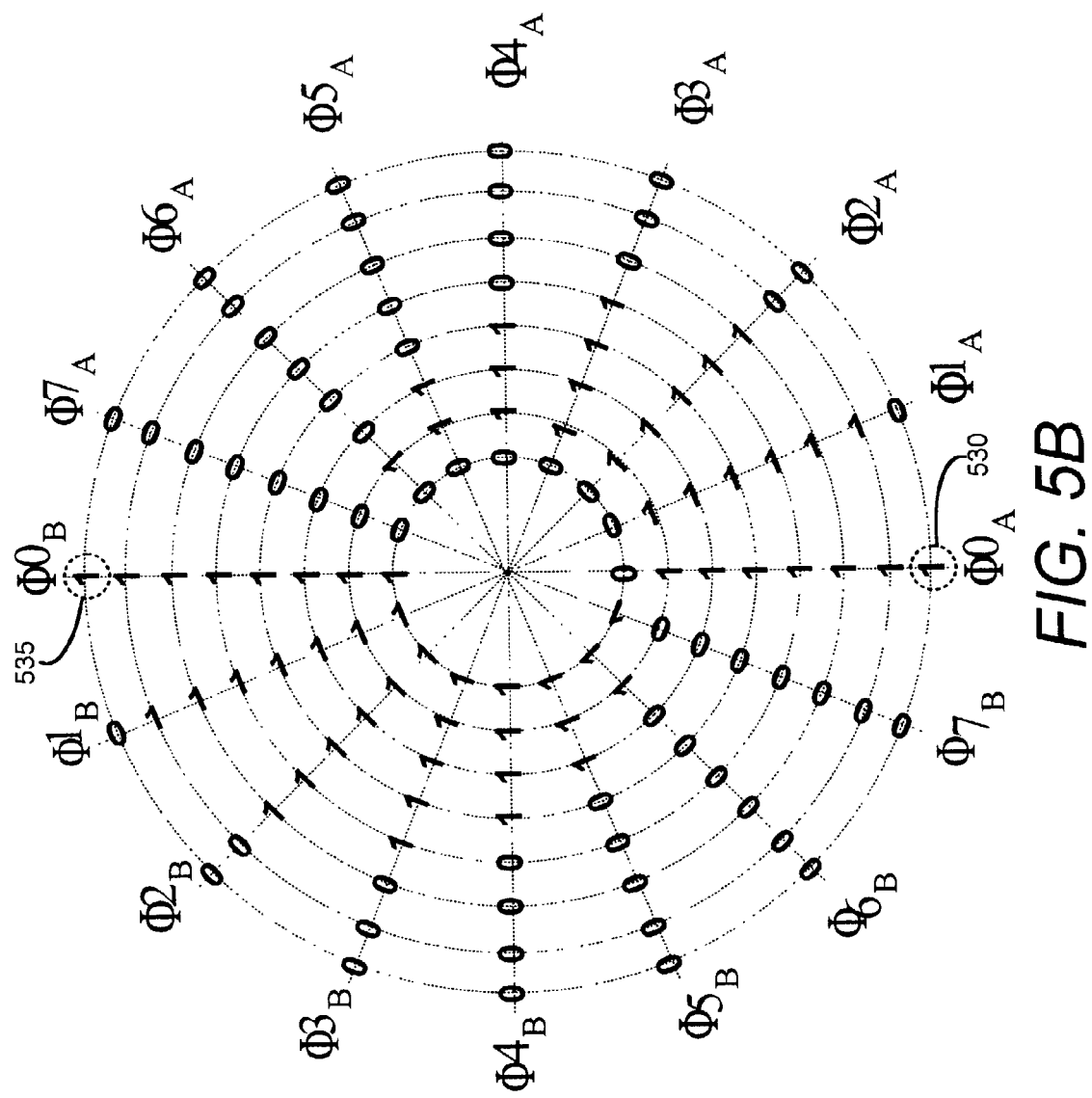
FIG. 5B is first graphical representation of a logical structure as applied to a first exemplary temporal data snapshot according to an aspect of the invention.

Turning to FIG. 5B, temporal snapshot data bits D0–D15 are received as '0000000011111111' (Op. 610), and disposed at respective axis positions $\Phi 0_A$–$\Phi 7_A$ 510–517 and $\Phi 0_B$–$\Phi 7_B$ 520–527, i.e., ring-bit phase positions $\Phi_{C0}$ . . . $\Phi_{C15}$, to create the first code ring, Code Ring 1 (Op. 620). Code Ring 2 502 is created by performing a preselected ring coding technique on Code Ring 1 501 data bits. In FIG. 5B, an XNOR logic operation upon data bits at adjacent ring-bit locations is performed and the ring-bit locations at each phase position of Code Ring 2 502 would be assigned the respective values '1111111011111110' and be disposed at respective axis positions $\Phi 0_A$–$\Phi 7_A$ 510–517 and $\Phi 0_B$–$\Phi 7_B$ 520–527 (Op. 630). At each ring-bit phase position $\Phi_X$, Code Ring 2 502 is evaluated for the presence of the sentinel condition of a logic '1' surrounded by two logic '0's. Because, in the present example, the sentinel condition is not present, processing continues by advancing to the next code ring (Op. 650), creating Code Ring 3 503 from Code Ring 2 502, using a preselected coding technique, such as performing an AND logic operation upon Code Ring 2 502 data bits at adjacent ring-bit locations (Op. 630).

The result of Op. 630 yields respective values of 1111110011111100 at axis positions $\Phi 0_A$–$\Phi 7_A$ 510–517 and $\Phi 0_B$–$\Phi 7_B$ 520–527, i.e., ring-bit phase positions $\Phi_{C0}$ . . . $\Phi_{C15}$. Upon analysis (Op. 640), no sentinel condition is found, and processing continues as above for each successive Code Ring. After the creation of Code Ring 8 508 (Op. 630), the data bits at axis positions $\Phi 0_A$–$\Phi 7_A$ 510–517 and $\Phi 0_B$–$\Phi 7_B$ 520–527 are analyzed, and sentinel conditions 530, 535 are identified at respective axis positions $\Phi 0_A$ 510 and $\Phi 0B$ 520 (Op. 640). Because Code Ring p=8 is an even number, the phase offset is calculated to be $\Phi_T$=8/2=4. Therefore, the corresponding recovered clock phase $\Phi_R$ illustrated in the example of FIG. 5B is determined by advancing phase position $\Phi_X$ by $\Phi_T$ such that $\Phi_R$=$\Phi_X$+$\Phi_T$, i.e., the corresponding recovered clock phase $\Phi_R$=Phase_4.

Figure 5C:
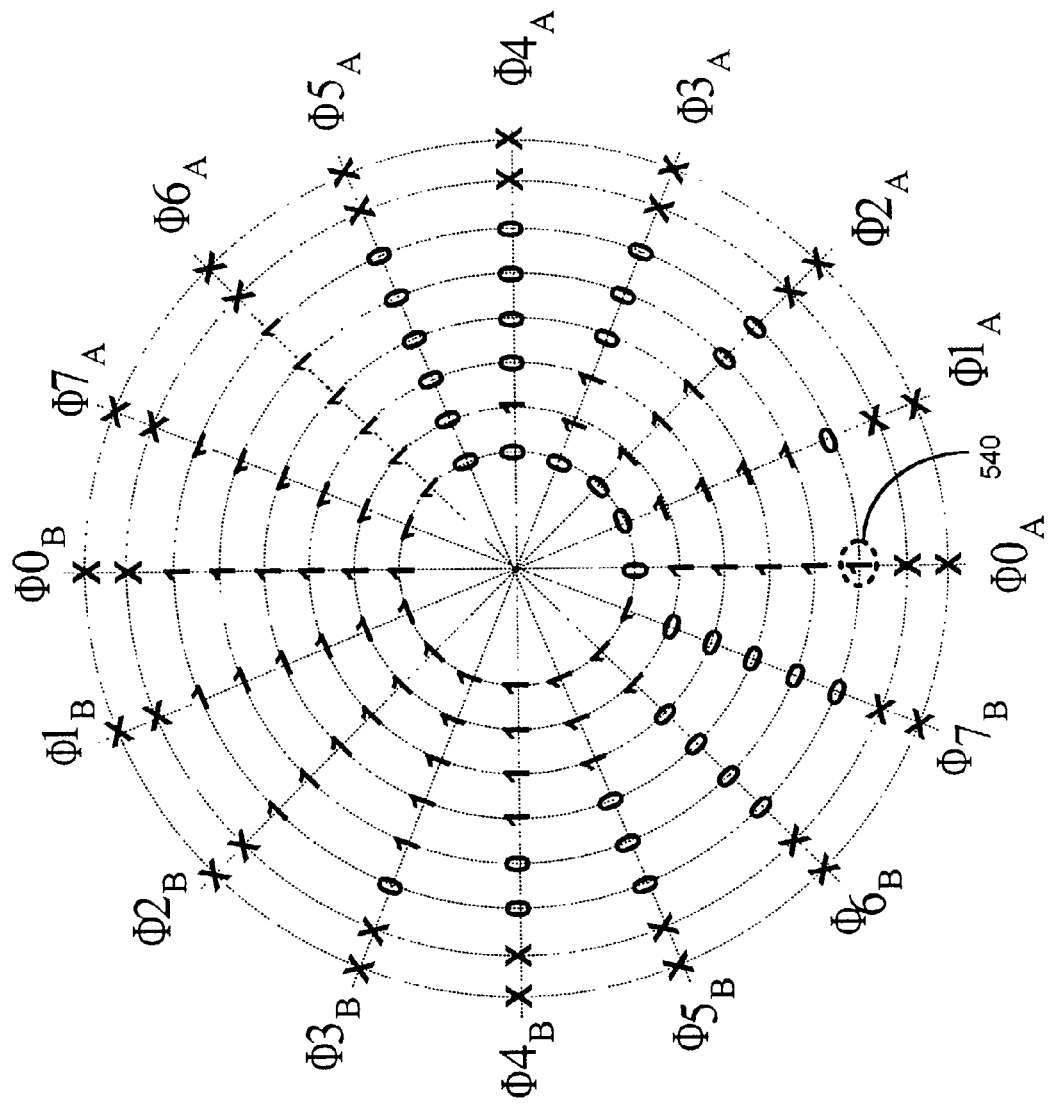
FIG. 5C is a second graphical representation of a logical structure as applied to a second exemplary temporal data snapshot according to an aspect of the invention.

In the example of FIG. 5C, temporal snapshot data bits D0–D15 are received as '0000001111111111' (Op. 610), and disposed at respective axis positions $\Phi 0_A$–$\Phi 7_A$ 510–517 and $\Phi 0_B$–$\Phi 0_B$ 520–527, i.e., ring-bit phase positions $\Phi_0$ . . . $\Phi_{15}$, to create the first code ring, Code Ring 1 501 (Op. 620). Code Ring 2 502 is created by performing a preselected ring coding technique on Code Ring 1 501 data bits. As in FIG. 5B, an XNOR logic operation is performed upon data bits at adjacent ring-bit locations (Op. 630) for Code Ring 2 502, and an AND logic operation is performed upon data bits at adjacent ring-bit locations (Op. 630) for Code Rings p>2 503–508. In FIG. 5C, sentinel condition 540 is found at axis position $\Phi 0_A$ 510 on Code Ring 6 506, i.e., $\Phi_X$=0, $\Phi_T$=3, and the corresponding recovered clock phase $\Phi_R$=Phase_3. Code Rings 7 and 8 are not created or analyzed.

Figure 5D:
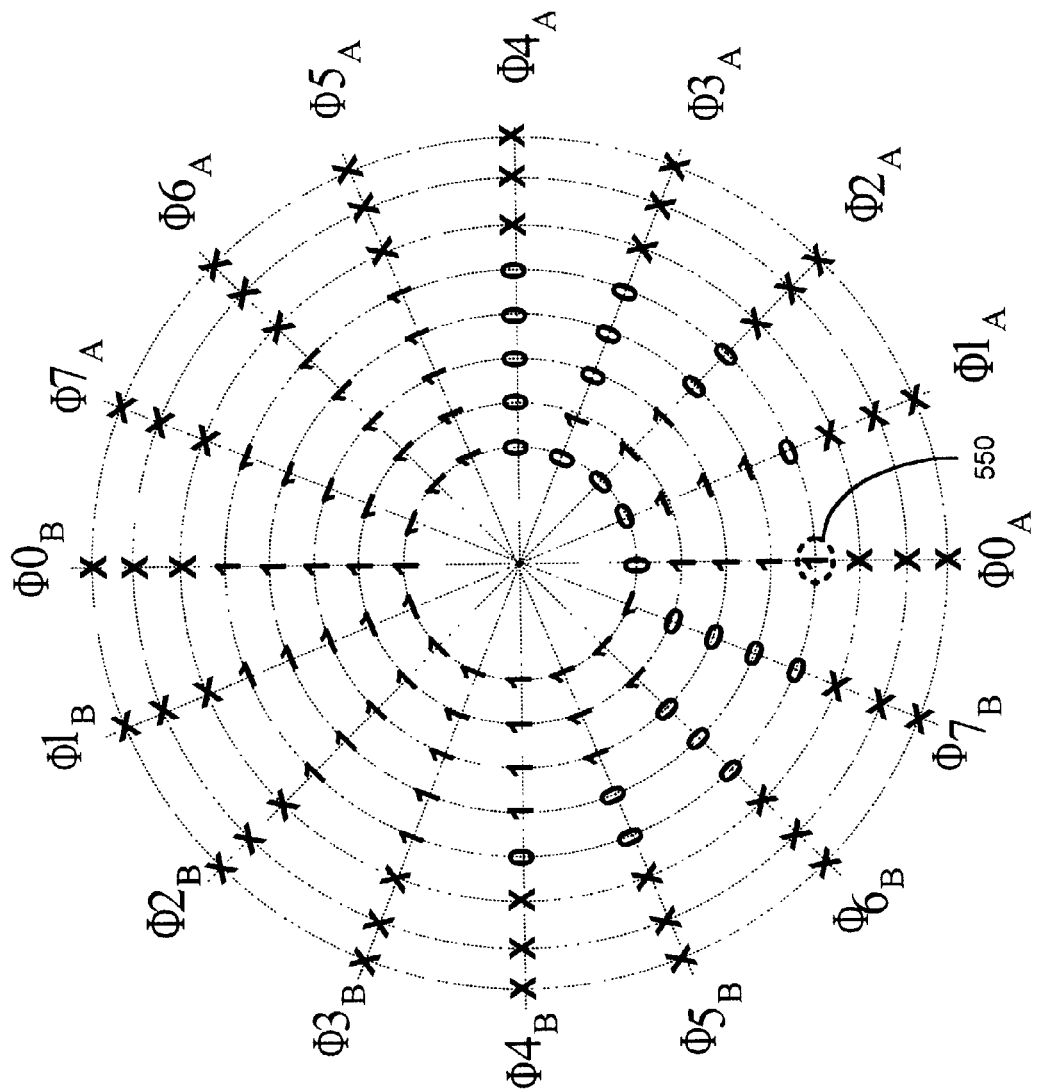
FIG. 5D is third graphical representation of a logical structure as applied to a third exemplary temporal data snapshot according to an aspect of the invention.

FIG. 5D illustrates a temporal snapshot having data bits D0–D15 of '0000011111111111' which is successively processed using the aforementioned operations of method 600. Because the sentinel condition is identified on Code Ring 5 505, Code Ring 6–8 506–508 are not created. Here, $\Phi_T$=2. Similar to previous examples, the sentinel condition is found at axis position $\Phi 0_A$ 510, i.e., $\Phi_X$=0, giving corresponding recovered clock phase $\Phi_R$=Phase_2.

Figure 5E:
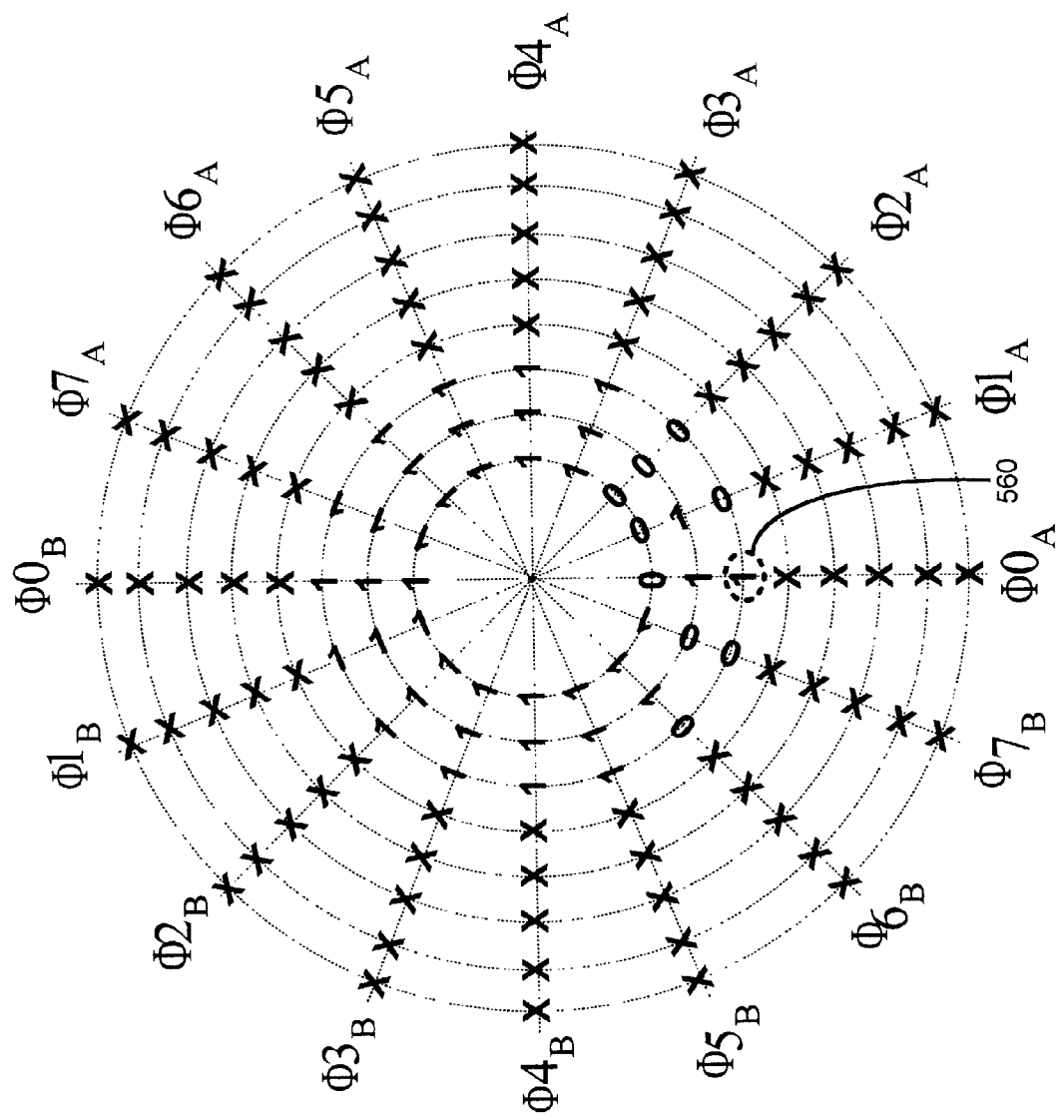
FIG. 5E is a fourth graphical representation of a logical structure as applied to an exemplary temporal data snapshot, having a distorted duty cycle, according to an aspect of the invention.

FIG. 5E illustrates the resilience of the present invention to duty cycle distortion. A temporal snapshot having data bits D0–D15 of '0001111111111111' is successively processed using the aforementioned operations of method 600. This snapshot may be regarded as having data with a distorted duty cycle. Nevertheless, the sentinel condition is identified on Code Ring 3 503 and $\Phi_T$=(3−1)/2=1. Sentinel condition 550 is found at axis position $\Phi 0_A$ 510, i.e., $\Phi_X$=0, thus the corresponding recovered clock phase $\Phi_R$=Phase_1. Code Rings 4–8 504–508 are neither processed nor analyzed. Advantageously, clock and data recovery employing the present inventive methods are resilient to duty cycle distortion, for example, below 30%, in which the data eye are narrow and the center more difficult to locate.

Figure 5F:
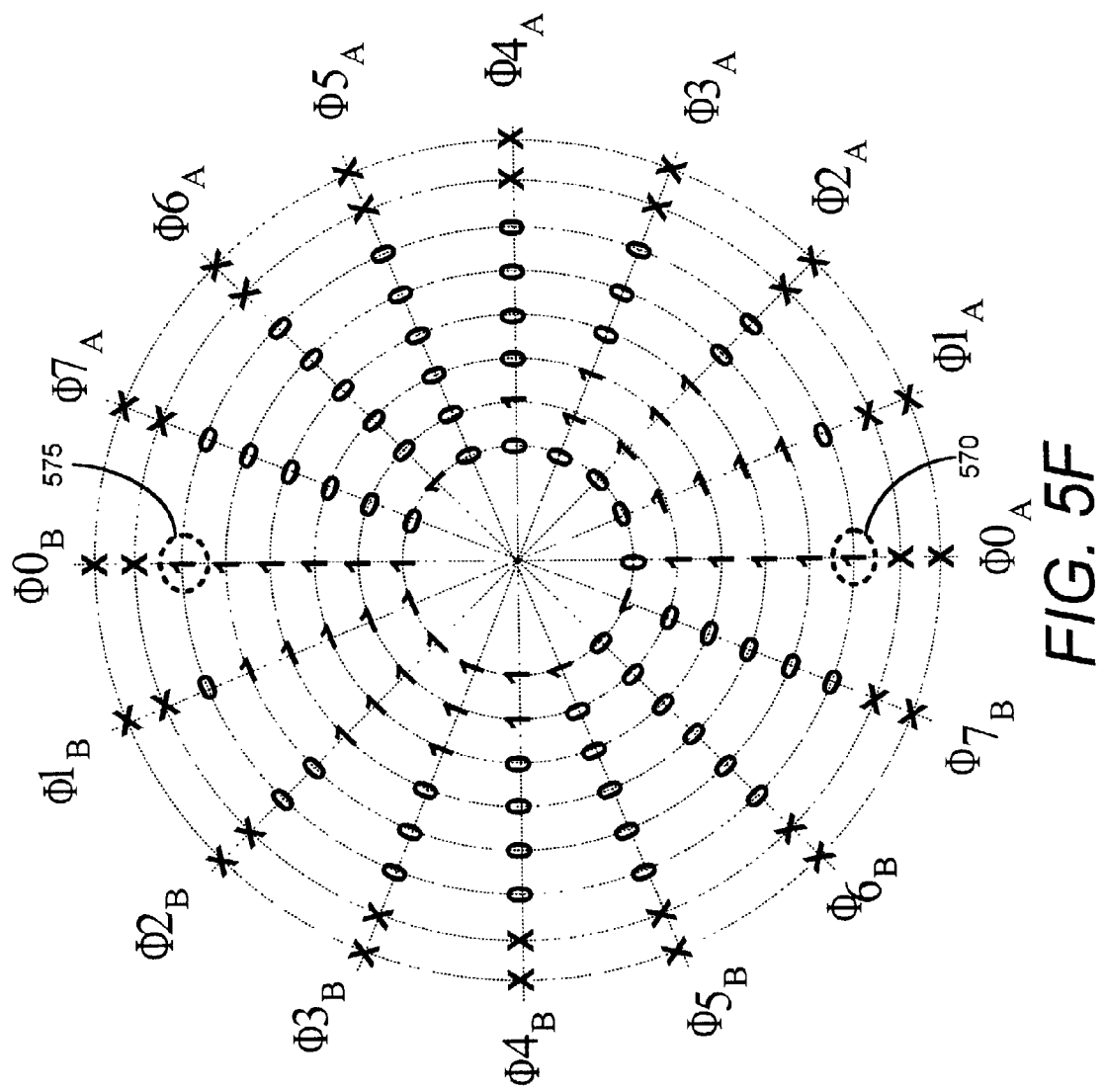
FIG. 5F is a fifth graphical representation of a logical structure as applied to an exemplary temporal data snapshot according to an aspect of the invention.
Figure 5G:
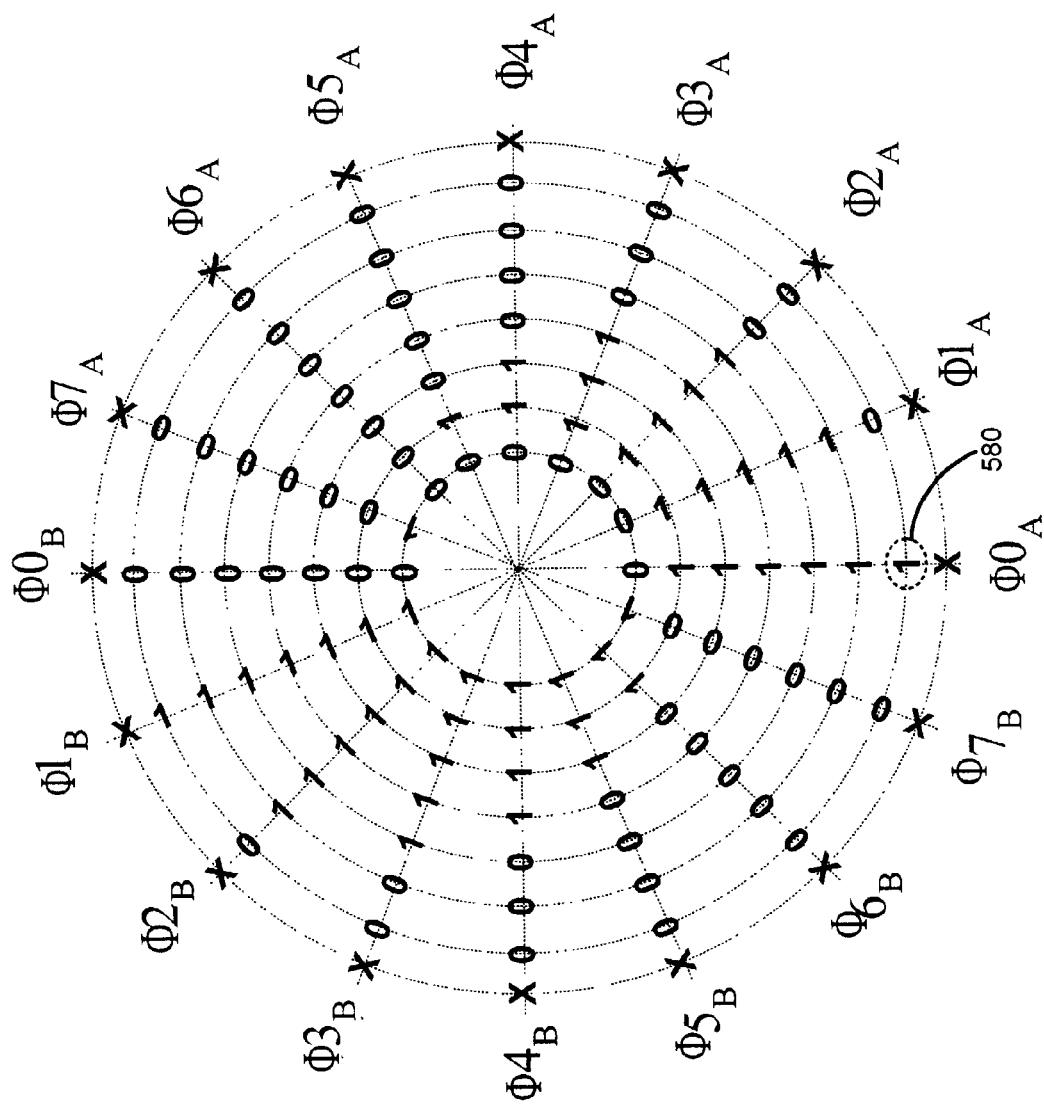
FIG. 5G is a sixth graphical representation of a logical structure as applied to an exemplary temporal data snapshot exhibiting metastability relative to FIG. 5F.

FIGS. 5F and 5G illustrate the resilience of the present invention to glitched data, e.g., when a capturing flip-flop of the snapshot, or other register, is metastable at the data transition. In FIG. 5F, the provided temporal snapshot has values for D0–D15 of logic '0000001011111101.' Corresponding sentinel conditions 570, 575 Code Ring 6 506, i.e., $\Phi_T$=3, at respective phase positions $\Phi 0_A$ 510, $\Phi 0_B$ 520, i.e., $\Phi_X$=0. Therefore, the corresponding recovered clock phase $\Phi_R$=Phase_3. In FIG. 5G, the provided temporal snapshot has values for D0–D15 of logic '0000000101111111' with data bit D14, i.e., at bit ring phase position $\Phi_{14}$ of axis position $\Phi 6_B$ 526, being logic '1' versus logic '0' as in FIG. 5F, due to metastability in that bit location. Corresponding sentinel condition 580 occurs on Code Ring 7 507, and the phase offset is determined, with $\Phi_T=3$ at axis position $\Phi 0_A$ 510, i.e., $\Phi_X=0$. Therefore, as in FIG. 5F, the corresponding recovered clock phase $\Phi_R$=Phase_3.

Many alterations and modifications may be made by those having ordinary skill in the art, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptually equivalent, and also what incorporates the ideas of the invention.

What is claimed is:

1. A method of synchronizing a transmitter and a receiver, comprising:
   receiving a transmitted serial data stream;
   creating an N-bit data sample from the serial data stream; and
   successively forming further N-bit data samples based on the N-bit data sample and examining each of the further N-bit data samples for a sentinel condition, until the sentinel condition is found; and
   selecting a clock signal of a plurality of clock signals based on a location of the sentinel condition.

2. The method of claim 1, further comprising recovering data from the serial data stream using the selected clock signal.

3. The method of claim 1, wherein the selected clock signal is selected within 8 bit times.

4. The method of claim 1, wherein the selected clock signal is selected within 8 bit times of creating the N-bit data sample.

5. The method of claim 1, wherein creating the N-bit data sample from the serial data stream further comprises creating the N-bit data sample from the serial data stream over an M-bit period of the serial data stream.

6. The method of claim 1, wherein the selected clock signal has an active edge approximately at the center of a data-eye of the serial data stream.

7. The method of claim 1, further comprising locking the selected clock signal after selecting the clock signal of the plurality of clock signals based on said location of the sentinel condition.

8. The method of claim 7, further comprising unlocking the selected clock signal in response to a predetermined unlocking signal.

9. The method of claim 8, wherein the predetermined unlocking signal is one of an end of transmission character or a RESET signal.

10. A method of synchronizing a transmitter and a receiver, comprising:
    receiving a transmitted serial data stream;
    creating an N-bit data sample from the serial data stream; and
    decoding the N-bit data sample by a ring decoding technique, wherein the ring decoding technique comprises:
       creating a first code ring using the N-bit data sample, the first code ring having N ring-bit phase positions corresponding to N axis positions, with the N data bits of the N-bit data sample corresponding to one of the N ring-bit phase positions;
       creating a $p^{th}$ Code Ring from a previous code ring using a preselected ring coding technique, the $p^{th}$ code ring having N ring-bit phase positions corresponding to N axis positions, with N data bits of the $p^{th}$ code ring corresponding to the N ring-bit phase positions of the $p^{th}$ code ring;
       analyzing selected ones of the N data bits of the $p^{th}$ code ring for the presence of a sentinel condition;
       identifying a one of the N ring-bit phase positions of the $p^{th}$ code ring as being associated with the sentinel condition; and
       selecting a clock signal based on the one of the N ring-bit phase positions.

11. The method of claim 10, wherein the selected clock signal is selected within 8 bit times of creating the N-bit data sample.

12. A method of clock and data recovery from a transmitted serial data stream, comprising:
    creating an N-bit data sample from the serial data stream, the N-bit data sample being recovered from the serial data stream using N clock signals at N differing phases;
    decoding the N-bit data sample using a preselected ring decoding technique to determine which of the N clock signals to use for recovery of data from the serial data stream, wherein the preselected ring decoding technique comprises:
    receiving a temporal snapshot having N data bits corresponding to the N-bit data sample;
    creating a first code ring from the temporal snapshot, the first code ring having N ring-bit phase positions corresponding to N axis positions, each one of the N data bits corresponding to one of the N ring-bit phase positions;
    creating a $p^{th}$ code ring from an immediately previous code ring using a preselected ring coding technique, the $p^{th}$ code ring having N ring-bit phase positions corresponding to N axis positions generally corresponding with the N axis positions of the first code ring, and one of the N data bits of the $p^{th}$ code ring corresponding to one of the N ring-bit phase positions of the $p^{th}$ code ring;
    identifying a one of the N ringbit phase positions of the $p^{th}$ code ring as $\Phi_X$, $\Phi_X$ indicating a ring-bit phase position as providing a sentinal condition;
    determining a phase offset of:
       $\Phi_T=p/2$, if p is even; or
       $\Phi_T=(p-1)/2$, if p is odd;
       selecting a corresponding recovered clock phase $\Phi_R$ according to the relationship $\Phi_R=\Phi_X+\Phi_T$; and
    recovering data from the serial data stream using the corresponding recovered clock phase.

* * * * *